Patented May 26, 1925.

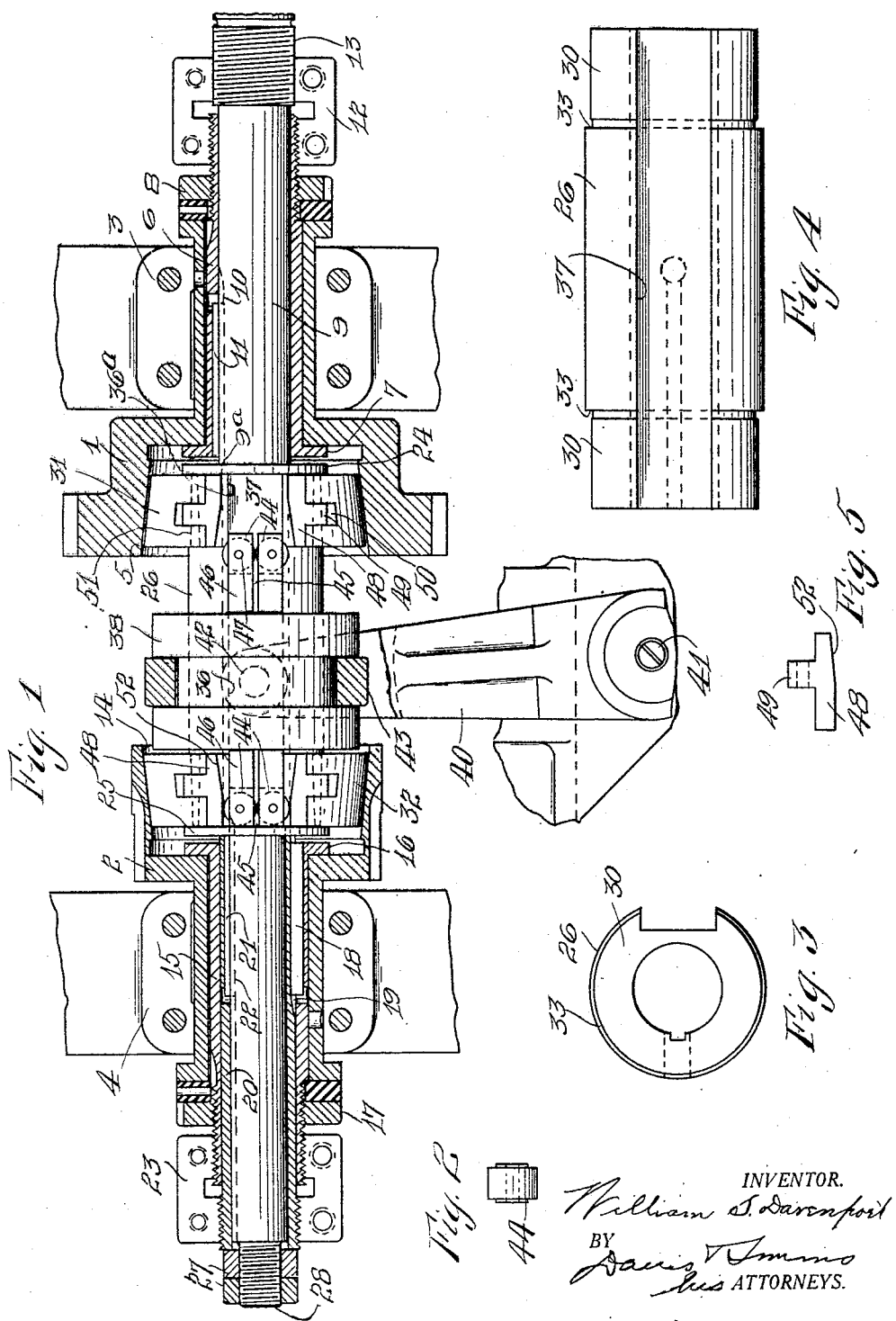

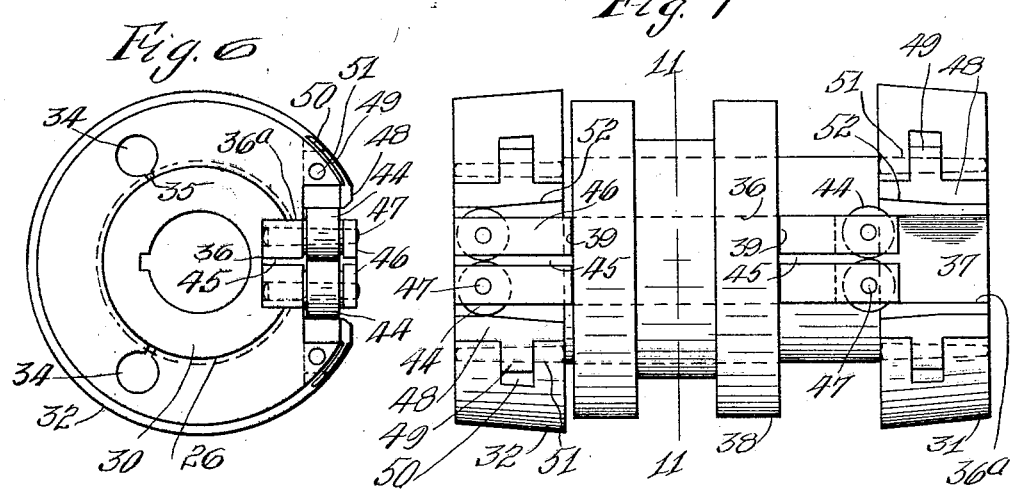
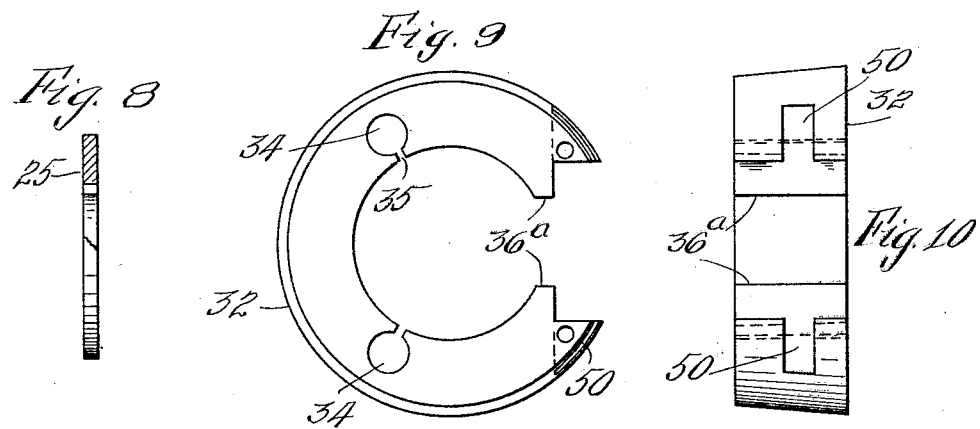
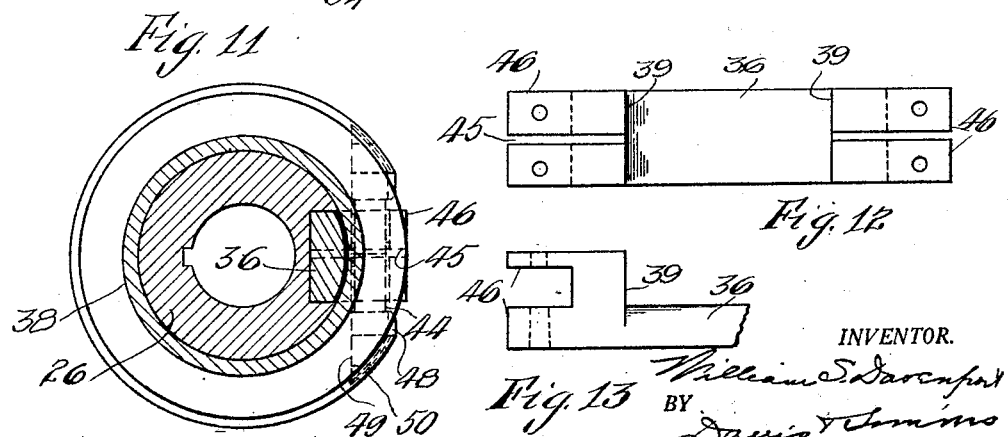

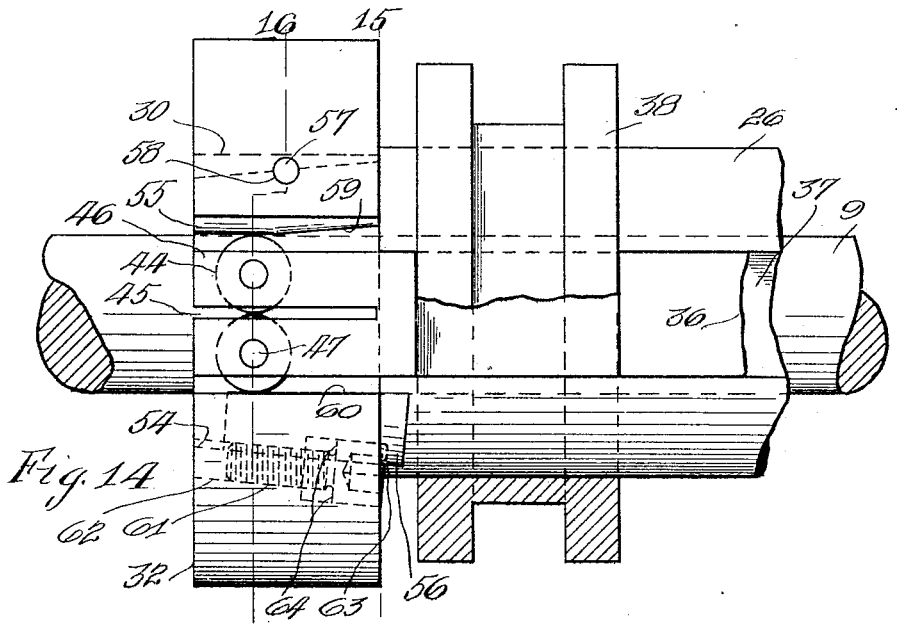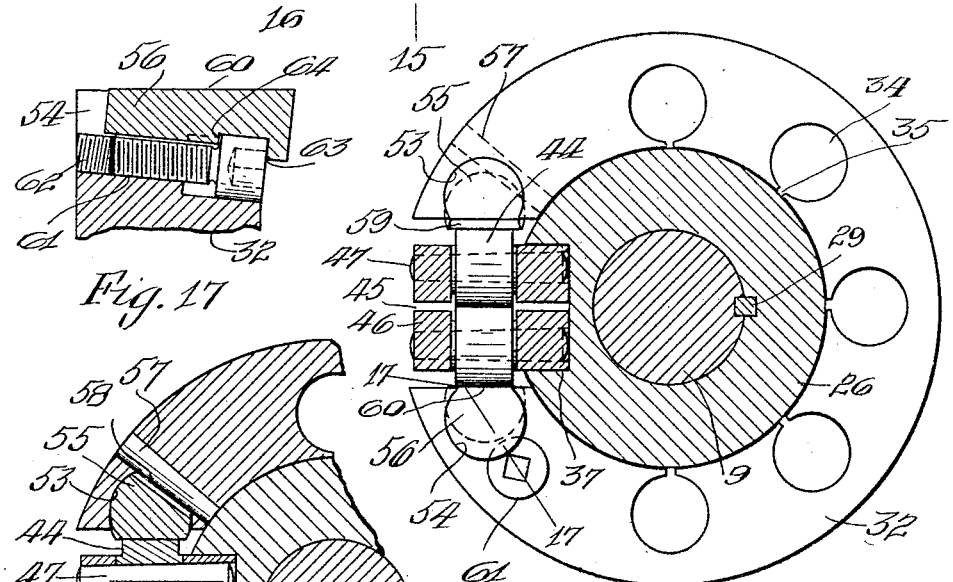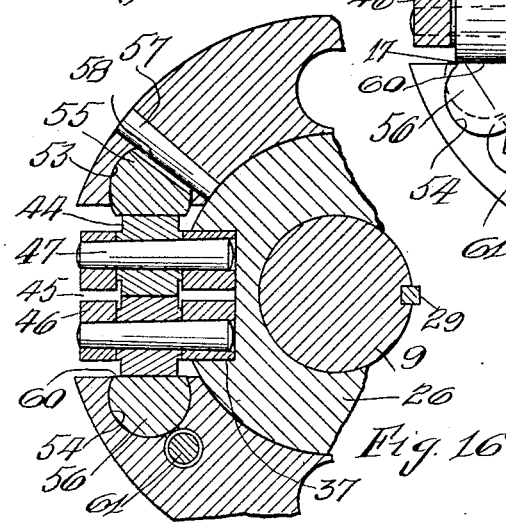

1,539,720

UNITED STATES PATENT OFFICE.

WILLIAM S. DAVENPORT, OF ROCHESTER, NEW YORK, ASSIGNOR TO DAVENPORT MACHINE TOOL CO., INC., OF ROCHESTER, NEW YORK, A CORPORATION.

CLUTCH.

Application filed July 28, 1921. Serial No. 488,106.

*To all whom it may concern:*

Be it known that I, WILLIAM S. DAVENPORT, a citizen of the United States, and resident of Rochester, in the county of Monroe and State of New York, have invented certain new and useful Improvements in Clutches, of which the following is a specification.

The present invention relates to clutches and more particularly to the type in which there is employed a clutch member with an internal clutching face, and an expansible clutching member arranged to cooperate with said face. An object of this invention is to provide for taking up for wear between two tapered clutching faces on the two members by shifting the one with the internal clutching face in the direction of the axis of turning of said member. Another object of the invention is to provide an improved double clutch construction. Still another object of the invention is to provide a novel expanding means for a split expanding clutch member. A further object of the invention is to provide an expanding means for a split clutch member in which two expanding rollers operate in the split and engage the periphery of each other. A still further object of the invention is to mount two clutch expanding rollers on resilient supports so that cooperation between their peripheries may be maintained during the expanding action. Another and still further object of the invention is to provide a split clutch member with rocking bearing surfaces for the expanding means so that proper cooperation between the expanding means and the surfaces may be maintained during the expansion of the clutch member. Still another object of the invention is to adjustably mount one of the bearing surfaces for an expanding means so as to take up for wear between the surface and such expanding means.

To these and other ends, the invention consists of certain parts and combinations of parts all of which will be hereinafter described, the novel features being pointed out in the appended claims.

In the drawings:

Fig. 1 is a longitudinal section through a double clutch constructed in accordance with this invention, parts being shown in elevation;

Fig. 2 is a detail view of one of the expanding rollers;

Fig. 3 is a detail end view of the sleeve connecting the two split friction members;

Fig. 4 is another detail side view of the sleeve connecting the two split friction members;

Fig. 5 is a detail view of one of the bearing pieces at the ends of the split friction members with which the expanding means cooperates;

Fig. 6 is an end view of a split friction member attached to the connecting sleeve, the expanding rollers being shown as cooperating with the clutch ring;

Fig. 7 is a side view of the two split friction members mounted upon the connecting sleeve and having the expanding means associated therewith;

Fig. 8 is a detail view partially in section showing one of the washers or flanges which cooperate with the split friction members for holding the latter on the connecting sleeve;

Fig. 9 is a face view of one of the split friction members;

Fig. 10 is a side view of one of the friction members;

Fig. 11 is a section on the line 11—11, Fig. 7;

Fig. 12 is a face view of the carrier for the expanding rollers;

Fig. 13 is a fragmentary view of the carrier;

Fig. 14 is a fragmentary view partially in section of another embodiment of the invention in which the bearing pieces for the expanding means are mounted to rock to accommodate the bearing surfaces to the expanding rollers during the expansion of the split friction members;

Fig. 15 is a section on the line 15—15, Fig. 14;

Fig. 16 is a fragmentary section on the line 16—16, Fig. 14; and

Fig. 17 is a fragmentary section on the line 17—17, Fig. 15.

The invention is herein illustrated in a double clutch, but it is apparent that it is not limited to this arrangement.

In the illustrated embodiment of the invention, two clutch members 1 and 2 are mounted to turn in bearings 3 and 4 respectively. The clutch member 1 has an internal tapered clutch face 5 and turns about a sleeve 6 between a fixed flange 7 thereon, and an adjustable flange or ring 8. The sleeve 6 is mounted to turn with a shaft 9 which it surrounds, and to this end, the shaft has a longitudinally extending groove 10 in which a longitudinally extending key 11 on the sleeve 6 is adapted to slide, for the purpose of effecting the longitudinal adjustment of the clutch member 1. This adjustment, in this instance, is effected through a nut 12 which has right and left internal threads cooperating respectively with right hand threads on the sleeve 6 and the left hand threaded portion 13 on the shaft 9. The clutch member 2 has an internal tapered clutch face 14 and turns about a sleeve 15 between a fixed flange 16 thereon and an adjustable ring or flange 17. The sleeve 15 carries a longitudinally extending key 18 adjustable in a longitudinally extending groove 19 in a sleeve 20 which surrounds the shaft 9, the sleeve 20 being connected with the shaft 9 through a key 21 on the shaft operating in a groove 22 in the sleeve 20. Adjustment of the clutch member 2 with reference to the shaft 9 is obtained through a nut 23 having internal right and left hand threads, the former engaging right hand threads on the sleeve 15 and the latter engaging the left hand threads on the sleeve 20.

The shaft 9 has two different diameters with a shoulder 9ª between them and against this shoulder a flange or ring 24 rests to act as an abutment for one end of a sleeve 26. The other end of the sleeve abuts a flange or ring 25 which is held against the sleeve 26 by the sleeve 20. The latter in turn is held at its opposite end by two nuts 27 operating on a screw threaded portion 28 formed on the shaft 9. This confines the sleeve 26 against axial movement on the shaft 9 and to prevent rotary movement a key 29 connects the shaft 9 with the sleeve 26. The sleeve 26 has reduced portions 30 at opposite ends, and on these reduced portions the clutch members 31 and 32 are arranged, being confined between the shoulders 33 formed at the inner end of the reduced portions 30 and the flanges 24 and 25. The clutch members 31 and 32 are each in the form of expansible split rings with tapered peripheries for cooperating with the internal tapered surfaces on the clutch members 1 and 2, the resiliency of the rings being obtained by providing these rings with transverse bores 34 near their inner peripheries and slitting their inner peripheries at 35 to intersect the bores.

For effecting the expansion of the rings, there is provided an expanding means comprising, in this instance, a slide 36 movable longitudinally of the sleeve 26 in a way or groove 37 formed in the outer face of said sleeve longitudinally thereof. The sides of the slide also cooperate with the surfaces 36ª on the rings 31 and 32 and in this way the latter are prevented from turning on the sleeve 26. The slide is operated longitudinally of the sleeve 26 in any suitable manner as by an annularly grooved collar 38 which slides on the collar or sleeve 26 and lies between the shoulders 39 formed on such slide 36. The operation of the collar 38 may be effected by any suitable means, as by a suitable operated yoke 40 pivoted at 41 and pivotally connected at 42 to a ring 43 lying in the groove of the collar 38.

The slide 36 carries at opposite ends the expanding devices for the clutch rings 31 and 32 to cause the latter to engage respectively with the clutch faces 5 and 14 of the respective clutch members 1 and 2. These devices, in this instance, embody two rollers 44 arranged at each end of the slide, the slide being slotted at 45 at each end to provide a pair of resilient arms 46 on each of which one of the rollers 44 is journalled by means of a tapered shaft or pin 47, the larger end of which lies on the inner side of the slide so that the pin is confined in its bearing. The peripheries of the two rollers at each end lie in abutment and also project beyond opposite sides of the slide 36 to cooperate with bearing surfaces formed on the rings 31 and 32 on opposite sides of the split.

In the embodiment of the invention, shown in Figs. 1 to 11, the split rings 31 and 32 have each of their ends at the slit provided with bearing pieces 48 which are held to the rings by lugs 49 projected from the bearing pieces and received within notches 50 in the adjacent ends of the ring, the lugs 49 being held in the notches by taper pins 51 which pass through the clutch rings and the lugs. In this instance, each bearing piece has a bearing surface 52 at a slight angle to the axis of turning of the clutch ring, it being apparent that, when the slide 36 is moved to carry the rollers 44 into engagement with two of the surfaces 52 of the bearing pieces 48, the clutch ring on which said bearing surfaces are provided will be expanded and the outer tapered periphery of said ring will be brought into frictional contact with the tapered clutch face of the clutch member with which such ring cooperates, thus establishing binding action between the clutch ring and its cooperating clutch member.

In the embodiment of the invention, illustrated in Figs. 14 to 17, the parts are constructed similarly to those illustrated in Figs. 1 to 13 inclusive with the exception that the bearing pieces with which the rollers 44 cooperate have been modified. In this latter embodiment of the invention, the bearing pieces are mounted to rock about axes extending transversely of the plane of movement of the clutch ring, so as to accommodate the surfaces to the rollers during the expansion of the ring, and to this end, the opposed walls of the split of each ring are formed with grooves 53 and 54, which are arcuate in cross section and extend in the direction of, but are slightly inclined to the axis of turning of the clutch ring. A bearing piece 55 is arranged in the groove 53, while a bearing piece 56 is arranged in the groove 54, both of said bearing pieces having segmental cylindrical walls and being adapted to rock in the grooves 53 and 54. A pin 57 passes through the clutch ring and into a notch 58 of the bearing member 55 to hold the bearing member 55 against longitudinal movement in the groove, while permitting the rocking of the bearing member 55. This bearing member has a surface 59 with which one of the rollers 44 cooperates, such surface being inclined slightly to the axis about which the clutch member turns. The bearing member 56 has a surface 60 which is substantially parallel with the axis about which the clutch member turns, and the bearing member 56 while it is permitted to rock in the clutch ring or member is adjustable on the clutch member on a line at a slight angle to the axis about which the clutch member turns so as to take up for wear. This adjustment, in this instance, is obtained through a screw 61 which is mounted to turn in a screw threaded opening 62 parallel with the line of adjustment of the bearing member 56, the screw 61 having a head which operates between two shoulders 63 and 64 on the bearing member 56, as shown in Fig. 17. It is apparent that when the screw 61 is turned, it will move longitudinally in the opening 62 and through the engagement of the head with the bearing member 56 will shift such bearing member. The head of the screw 61 engages the bearing member in such a manner that the turning of the bearing member 56 in the clutch ring is not interfered with.

The operation of the invention will be understood from the foregoing description but it may be summarized as follows: Assuming that power is applied to the shaft 9 and it is desired to drive either one of the clutch members 1 or 2, the yoke 40 is swung to shift the collar 38 toward that member 1 or 2 which it is desired to turn. This shifting of the collar 38 moves the slide to cause two of the rollers 44 at one end of the slide to engage with the bearing pieces of the clutch member or ring 31 or 32. This expands the clutch ring, which by turning with the sleeve 26, that is keyed to turn with the shaft 9, will transmit motion to the selected clutch member 1 or 2, due to the frictional engagement between the split ring or clutch member and the inner clutch face of the clutch member 1 or 2. The clutch members 1 and 2 are both adjustable longitudinally of the shaft 9 so that proper cooperation may be obtained between the clutch members 1 and 2 and the respective clutch rings 31 and 32. During the engagement of the rollers 44 with the bearing pieces, such rollers lie in contact with each other and, as a consequence, all strain on the bearing pins of such rollers is eliminated. Since these rollers are mounted on resilient arms, bearing contact between them is insured at all times.

From the foregoing it will be seen that there has been provided a friction clutch of the type embodying a split ring in which the ring is expanded by a pair of rollers movable in the split and having rolling contact with each other. These rollers are supported resiliently with reference to each other so that this rolling contact may be maintained without any undue strain on the bearings of the rollers. This resilient support for the contacting rollers is obtained by mounting them upon a slide or carrier which is split to provide two arms on which the two rollers are mounted. Rocking bearing pieces are provided on the split ring on opposite sides of the split so that the bearing surfaces may be maintained flat against the surface of the spreading rollers notwithstanding the expansion of the ring. In the embodiment illustrated in Figs. 14 to 17, one of the bearing pieces is adjustable on a line at a slight angle to the axis of rotation of the clutch ring so that proper cooperation with the sliding device is maintained. An outside clutch member is employed which is adjustable longitudinally of the shaft on which the split ring is mounted, so as to take up wear between the split ring and the outside clutch member. This adjustment is secured by mounting the outside clutch member to turn upon a sleeve which is adjustable axially of the shaft by which the expanding clutch member is carried.

What I claim as my invention and desire to secure by Letters Patent is:

1. A clutch comprising a shaft, an expansible clutch member mounted to turn with the shaft and having a tapering peripheral clutch face, a sleeve surrounding the shaft, turning therewith and adjustable longitudinally of said shaft, a right and left hand threaded nut cooperating with the shaft and the sleeve for adjusting the sleeve longitudinally of the shaft, and a second clutch member mounted to turn on the sleeve and to move axially of the shaft with the sleeve, said second mentioned clutch member having an internal tapered clutch face for engagement with the tapering peripheral clutch face of the expanding clutch member.

2. A clutch comprising a shaft, two clutch members mounted to turn about the shaft each having an internal clutch face, two flanges arranged on the shaft, a sleeve arranged on the shaft between the flanges and having reduced ends, split rings held on the reduced ends of the sleeve by said flanges, and means for expanding said rings into cooperation with the internal clutch faces of the clutch members.

3. A clutch comprising a shaft, one end of which is screw threaded, two flanges on the shaft, a sleeve arranged between said flanges, a sleeve for holding one of the flanges against the first mentioned sleeve, a nut on the screw threaded end of the shaft engaging the second mentioned sleeve to hold it against said flange, two clutch members turning about such shaft on opposite sides of the first mentioned sleeve, and two clutch members carried by the first mentioned sleeve and each adapted to cooperate with one of the first mentioned clutch members.

4. A clutch comprising two clutch members, one of which has an internal clutch face and the other of which is in the form of a split ring arranged to cooperate with said internal clutch face, and expansion means for the split ring embodying a movable member and two rollers carried by the member and having their peripheries engaging, said rollers being adapted to cooperate with the walls of the split of the split ring to effect the expansion of such ring.

5. A clutch comprising two clutch members, one of which has an internal clutch face, and the other of which is in the form of a split ring, and expansion means for the split ring embodying a movable member, two rollers carried by the member having their peripheries engaging, said rollers being adapted to cooperate with the walls of the split of the ring to effect the expansion of the ring, and means for supporting said rollers on said member to permit them to move toward each other in order to maintain their peripheries in engagement.

6. A clutch comprising two clutch members, one of which has an internal clutch face, and the other of which is in the form of a split ring, and expansion means for the split ring embodying two rollers having their peripheries engaging, said rollers being adapted to cooperate with the walls of the split of the ring to effect the expansion of the ring, and means for supporting said rollers to permit them to move toward each other in order to maintain their peripheries in engagement, said means comprising two resilient arms on which the rollers are mounted to turn.

7. A clutch comprising two clutch members, one of which has an internal clutch face and the other of which is in the form of a split ring, and expansion means for the split ring comprising a slide, resilient arms on the slide, and rollers turning on said arms and having their peripheries engaging each other, said rollers cooperating with the opposite walls of the split in the ring to expand the latter.

8. A clutch comprising a clutch member having an internal clutch face, a split expansible ring arranged to cooperate with said internal clutch face, bearing pieces having flat faces extending transversely of the plane of rotation of the ring and mounted to rock on said split ring at the split, and expanding means adapted to move in the direction of the axis of rotation of the clutch and engaging said bearing pieces.

9. A clutch comprising a clutch member having an internal clutch face, a split expansible ring arranged to cooperate with said internal clutch face, bearing pieces mounted to rock on said split ring at the split about axes extending transversely of the plane of rotation of the ring and having bearing faces also extending transversely of the plane of rotation of the ring, and expansion means movable in the direction of the axis of rotation of the clutch and having rollers arranged to cooperate with said bearing pieces to effect the expansion of the split ring.

10. A clutch comprising a clutch member having an internal clutch face, a split expansion ring arranged to cooperate with said internal clutch face, bearing pieces supported on said split ring at the split and having a bearing face extending transversely of the plane of rotation of the ring, one of said bearing pieces being adjustable transversely of the plane of rotation of the ring, and expansion means for the ring cooperating with said bearing pieces and movable in the direction of the axis of rotation of the clutch.

11. A clutch comprising a clutch member having an internal clutch face, a split expansible ring arranged to cooperate with said internal clutch face, bearing pieces mounted on said split ring at the split, said bearing pieces having bearing faces extending transversely of the plane of rotation of the ring being mounted to rock about axes extending transversely of the plane of turning of the split ring, and expansion means movable in a direction parallel with the axis of turning of the clutch cooperating with said bearing pieces to effect the expansion of the split ring.

12. A clutch comprising a clutch member having an internal clutch face, an expansible split ring arranged to cooperate with said internal clutch face, bearing pieces mounted to rock on the split ring at the split about axes extending transversely of the plane of rotation of the split ring, said bearing pieces having bearing faces extending transversely of the plane of rotation of the ring one of said bearing pieces being adjustable in a direction transverse of the plane of rotation of the ring, and expansion means movable in a direction parallel with the axis of turning of the clutch and cooperating with the bearing pieces to effect the expansion of the split ring.

13. A clutch comprising a clutch member having an internal clutch face, a split expansible ring arranged to cooperate with said internal clutch face, bearing pieces supported by the ring at the split and having bearing faces extending transversely of the plane of rotation of the ring, one of said bearing pieces being adjustable in a line at a slight angle to the axis of turning of the clutch, and expansion means movable in a direction parallel with the axis of turning of the clutch, for the split ring cooperating with said bearing pieces.

14. A clutch comprising a clutch member having an internal clutch face, a split expansible ring arranged to cooperate with said internal clutch face, bearing pieces mounted on said split ring and having bearing faces extending transversely of the plane of turning of the ring, one of said bearing pieces being mounted to rock about an axis extending transversely of the plane of turning of the split ring and being adjustable in the direction of said axis, and expansion means for the split ring movable in a direction parallel with the axis of turning of the clutch cooperating with said bearing pieces.

15. In combination with an expansible clutch member, of expansion means for said member embodying a movable member a pair of rollers movable with said member and having their peripheries turning in engagement.

16. In combination with an expansible clutch member, of expansion means for said member embodying a pair of rollers having their peripheries turning in engagement, said rollers being movably supported with reference to each other so that their peripheries may be maintained in engagement.

17. The combination of an expansible clutch member having a pair of rocking bearing members formed with bearing surfaces extending longitudinally of the axis about which the members rock, with two expansion rollers mounted to roll on said bearing surfaces of said bearing members to expand such clutch member.

WILLIAM S. DAVENPORT.